(12) United States Patent
Markow et al.

(10) Patent No.: US 8,604,654 B2
(45) Date of Patent: Dec. 10, 2013

(54) DRIVE UNIT FOR A MOTOR VEHICLE WITH AN ELECTRIC MACHINE

(75) Inventors: Alexander Markow, Schweinfurt (DE); Manfred Zimmer, Hassfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 73 days.

(21) Appl. No.: 13/049,524

(22) Filed: Mar. 16, 2011

(65) Prior Publication Data

US 2011/0227434 A1 Sep. 22, 2011

(30) Foreign Application Priority Data

Mar. 17, 2010 (DE) .......................... 10 2010 002 944

(51) Int. Cl.
*H02K 7/00* (2006.01)
(52) U.S. Cl.
USPC .......................... 310/71; 310/67 A; 310/75 C
(58) Field of Classification Search
USPC .............. 310/71, 67 A, 75 C; 180/65.1, 65.2
See application file for complete search history.

(56) References Cited

U.S. PATENT DOCUMENTS

| | | | | |
|---|---|---|---|---|
| 4,387,313 A | * | 6/1983 | Yamamoto et al. ............. | 310/71 |
| 4,518,886 A | * | 5/1985 | Kaneyuki ....................... | 310/71 |
| 5,901,801 A | * | 5/1999 | Toida et al. ................... | 180/65.1 |
| 6,459,182 B1 | * | 10/2002 | Pfann et al. ..................... | 310/77 |
| 6,470,984 B1 | | 10/2002 | Nakajima et al. | |
| 6,590,306 B2 | * | 7/2003 | Terada .......................... | 310/75 C |
| 6,707,185 B2 | * | 3/2004 | Hemmi et al. .................. | 310/71 |
| 7,193,344 B2 | * | 3/2007 | Kabasawa et al. .............. | 310/71 |

FOREIGN PATENT DOCUMENTS

| | | |
|---|---|---|
| EP | 1 067 003 | 1/2001 |
| EP | 1 705 776 | 9/2006 |

* cited by examiner

*Primary Examiner* — Dang Le
(74) *Attorney, Agent, or Firm* — Cozen O'Connor

(57) ABSTRACT

A drive unit for a motor vehicle having an electric machine including a rotor mounted so as to be rotatable around an axis A and coupleable, with a driveshaft acting on the vehicle wheels, and a stator having an electric winding whose terminations are connected to a power source by a connection device arranged at a housing opening of the drive unit and guided through this opening. A housing element encloses the rotor and the stator on the radially outer side. To arrange the connection device such that the installation space is optimized, the winding terminations are connected to first contact elements arranged fixed in position at the stator constructed as axial connectors with respect to the electric machine, and constitute stator contacts. These first contact elements are connected to second contact elements constructed to correspond to the first contact elements arranged at a wall area of the drive unit, and constitute wall contacts. The wall contacts are electrically connected to the connection device or form this connection device.

7 Claims, 1 Drawing Sheet

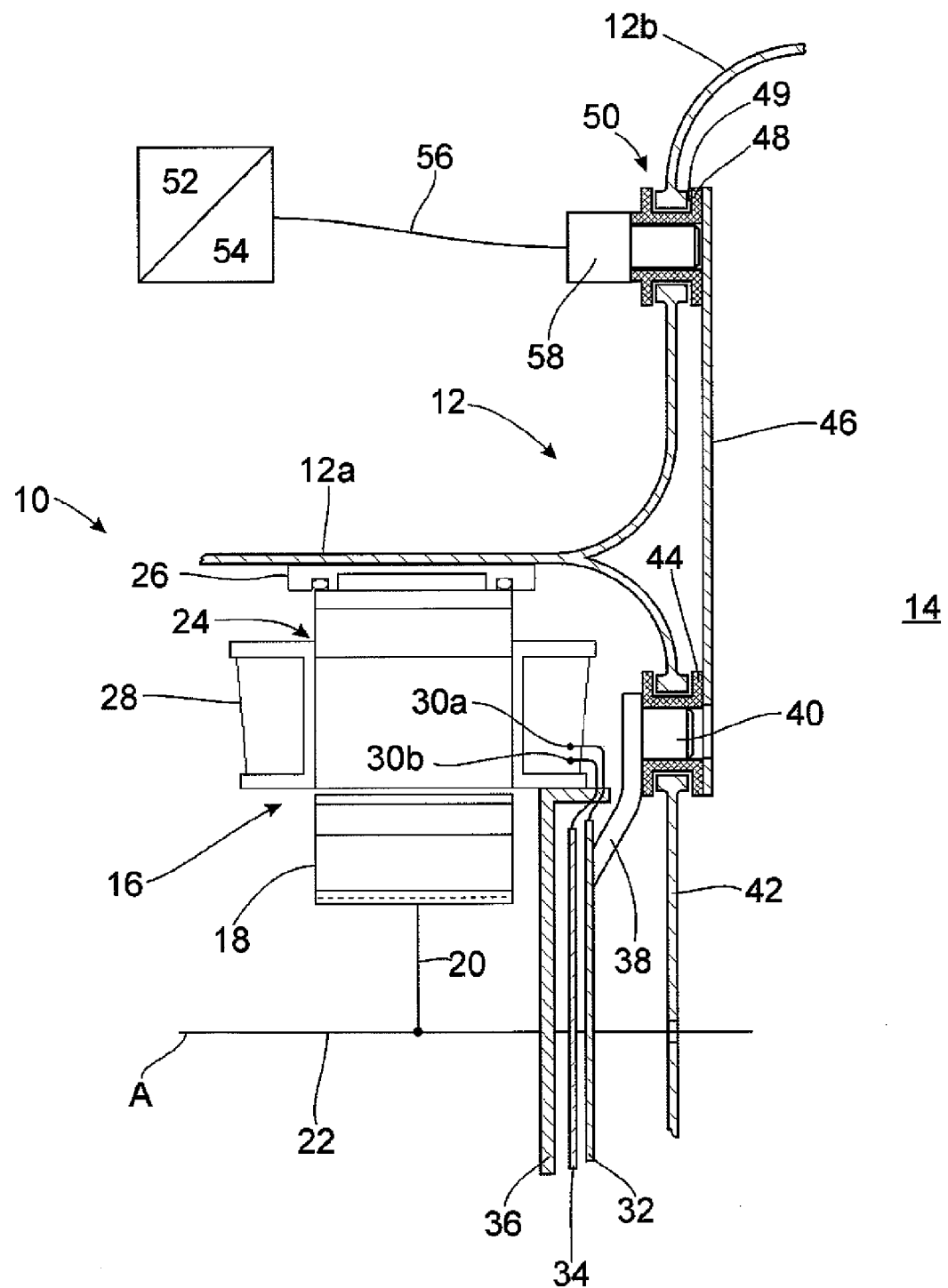

DRIVE UNIT FOR A MOTOR VEHICLE WITH AN ELECTRIC MACHINE

BACKGROUND OF THE INVENTION

1. Field of the Invention

The present invention is directed to a drive unit for a motor vehicle with an electric machine.

2. Description of the Related Art

A drive unit of the kind mentioned above is known from EP 1 067 003 B1. The electric machine and the other components forming the drive unit, e.g., an internal combustion engine, a clutch, and a transmission, are usually provided as individual modules and are connected by the vehicle manufacturer to form a collective unit. The electric machine includes at least the rotor, the stator, possibly a housing element that supports the stator and encloses the stator and rotor, and a connection device by which the stator winding can be connected to a power source. As is shown in the above-cited patent, it is common practice to fasten the connection device to the above-mentioned housing element. For this purpose, an opening is provided in this housing element for arranging a switch box that penetrates through the opening and that takes up a certain radial installation space inside the housing that is not available for the construction of the stator and/or rotor. Further, a connection device constructed in this way requires that special steps be undertaken to seal it, particularly so as to prevent water and moisture from entering the interior of the machine in its immediate vicinity and, therefore, damage to components and failure of the electric machine.

SUMMARY OF THE INVENTION

To address this problem, one object of the invention is improving a drive unit for a motor vehicle with an electric machine in such a way that the spatial extension, particularly the radial extension, of the rotor and stator in a predetermined installation space is optimized on the one hand and the connection device for the electric machine is improved on the other hand.

One embodiment of the invention proposes a drive unit for a motor vehicle with an electric machine that comprises a rotor mounted so as to be rotatable around an axis A and that can be coupled, or is coupled, with a driveshaft acting on the vehicle wheels, and which further comprises a stator having an electric winding whose terminations can be connected to a power source by a connection device arranged at a housing opening of the drive unit and guided through this opening. Further, the electric machine comprises a housing element that encloses the rotor and the stator on the radially outer side.

According to one embodiment of the invention, the drive unit is characterized in that the winding terminations are connected to first contact elements arranged so as to be fixed in position at the stator constructed as axial connectors with respect to the electric machine, and constitute stator contacts, the first contact elements can be connected, or are connected, to second contact elements constructed so as to correspond to the first contact elements arranged at a wall area of the drive unit, and constitute wall contacts, and the wall contacts are electrically connected to the connection device or form this connection device.

Accordingly, one embodiment of the invention the electric machine is constructed with its rotor and its stator separate from its connection device to the power supply. To this end, the electric connection between the winding or between the stator and the connection device is constructed of at least two parts, specifically with a first connection portion from the stator winding to the stator contacts and with a second connection portion from the wall contacts to the connection device. In so doing, the stator contacts and the wall contacts are constructed as axial connection elements. The area having the wall contacts preferably extends substantially radial to the axis A, although this is not absolutely necessary. The wall contacts can also be arranged at an axially extending area. It is essential in every case that the wall contacts are constructed as axial connectors with respect to axis A. In principle, the second connection portion can be arranged or installed at the wall area either before or after the electric machine has been mounted at the drive unit, so that a favorable position can be selected for securing the connection device. The stator contacts are preferably arranged within the radial extension of the rotor and stator.

Accordingly, it is not absolutely necessary that the connection device extends axially in the area of the electric machine or is arranged there. In particular, the connection device is secured at another wall area or housing not associated with the electric machine. In this way, beyond a mere assembly, the electric machine is integrated with another component of the drive unit. The proposed structural and spatial separation of the connection device from the stator offers the advantage that no radial installation space need be reserved for the connection device in the housing which radially encloses the electric machine. Rather, the rotor and stator can entirely take up the housing, i.e., can make the best possible use of the available installation space. Therefore, in principle, the connection device can be installed in any position and spatially in a portion of the drive unit that is most favorable with respect to installation space.

In assembling the drive unit, the electric machine is axially connected to another module comprising the wall area with the wall contacts, and the stator contacts and wall contacts are connected.

The connection device can now also be secured, for example, to a radial wall portion, and sealing is realized in a simple and reliable manner in a planar surface. The connection device can preferably comprise a switch box or a plug-in connection element which is fixedly mounted on the drive side or can also be constructed in a simple manner as a connection cable leading out of the housing.

According to a first advantageous construction, the wall area is formed as an intermediate wall, for example, for defining a wet space, or as an intermediate housing element or as a supporting wall for receiving the stator.

According to another particularly advantageous variant, the wall area is constructed for the arrangement of the second contact elements at a housing of another component of the drive unit, particularly as a transmission housing or as an internal combustion engine housing. It is further suggested that the electric machine be arranged inside a clutch housing or converter housing of a gearshift transmission, wherein the stator contacts cooperate with wall contacts arranged in the front wall of the transmission. If required, the wall contacts can be secured in the wall by a seal so that, for example, conductor elements leading to a connection device can be arranged in a transmission oil bath.

The housing opening of the connection device is advantageously formed at the wall area of the wall contact or at the housing.

In one embodiment, the stator contacts and the wall contacts together form a plug-in connection or bayonet connection. In particular, the connection is constructed so that the electric machine can be mounted blind and without tools.

Generally any kind of conductor may be used for connecting the wall contacts to the connection device. In a particularly space-saving manner, the connections are constructed as busbars, particularly flat conductors, which are guided very close to the wall and can be fastened to the latter.

The busbars are advantageously protected from external influences within a receiving space formed by a housing, e.g., within a receiving space for the gearwheels of a gearshift transmission.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

In the drawing:

FIG. 1 is a partial schematic view of a drive unit for a hybrid vehicle with an electric machine.

DETAILED DESCRIPTION OF THE PRESENTLY PREFERRED EMBODIMENTS

In the following, the invention will be described by way of example referring to the accompanying drawing. The drawing shows a simplified, partially schematic view of a drive unit 10 for a hybrid vehicle with an electric machine 16. The latter is arranged inside a housing, designated in its entirety by reference numeral 12, particularly inside a bell housing of a gearshift transmission 14 constituting a first housing element 12a. In the present embodiment example, the electric machine 16 is constructed as a permanently excited synchronous machine and comprises an internal rotor 18 which is mounted so as to be rotatable around an axis A and whose support 20 is rotatably connected to an input shaft 22 of the gearshift transmission 14 and can therefore deliver torque to vehicle wheels not shown in the drawing. The rotor 18 is enclosed radially by a stator 24 which is secured by a fluid-cooled stator support 26 to the bell housing 12a which externally encloses the electric machine 16. In a known manner, the stator 24 has an electric winding 28 in the form of individual coils whose terminations 30a, 30b are connected in a predetermined manner in accordance with the number of phases and the chosen manner of interconnection by ring conductors 32, 34, only two of which are shown, which are arranged concentric to the stator 24. In the drawing, the ring conductors 32, 34 are arranged at the front side of the electric machine 16 facing the transmission 14 within a support element 36 so as to be insulated, as is described and shown, for example, in EP 1 705 776 B1, and have first contact elements which are connected to or formed integral with them. In order to allow axial contact and connection, the first contact elements 38 or stator contacts, only one of which is shown in the drawing for the sake of simplicity, are constructed in the form of a connection pin 40 extending in axial direction toward the transmission 14 or have such a connection pin 40. The additional connection pins, not shown, can be arranged in a staggered manner radially or in circumferential direction relative thereto; all of the connection pins are fixed in position at the stator 24 and advantageously lie in a common radial plane.

FIG. 1 shows that the connection pins 40 penetrate into a substantially radially extending transmission wall area 42 which separates the first housing element 12a from a second housing element 12b receiving the gearwheel arrangement of the transmission 14. Second contact elements 44 in the form of connection sleeves, only one of which is shown in the drawing, which correspond to the first contact elements 38 and are electrically insulated with respect to the wall area 42 are arranged in this transmission wall area 42. The additional connection sleeves are arranged corresponding to the additional contact pins. As a result of this axial arrangement, the electric machine 16, particularly its stator 24, can be inserted axially into the interior of the first housing element 12a, its stator contacts 38, 40 simultaneously entering into a plug-in connection with the wall contacts 44 as can be seen in FIG. 1. The wall contacts 44 are connected, respectively, to busbars 46 which are installed in the interior of the gearshift transmission and are connected by their end areas to other wall contacts 48 which are likewise sleeve-shaped and arranged at one or more housing openings 49 of the second housing element 12b. These wall contacts 48 form a part of the connection device 50 for connecting the electric machine 16 to power electronics 54 which are supplied by a power source or energy accumulator 52 in order to drive these power electronics 54. The connection cable 56 installed between the power electronics 54 and the connection device 50 has plug-in contacts, particularly contact pins 58, which are connected to the wall contacts 48 of the connection device 50.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive unit for a vehicle having an electric machine comprising:
   a rotor rotatable around an axis, the rotor being configured to be coupled with a driveshaft acting on at least one wheel of the vehicle;
   a stator having an electric winding with terminations configured to be connected to a power source;
   a first housing element enclosing the rotor and the stator on a radially outer side;
   a connection device at a housing opening of the drive unit;
   axial connectors arranged axially with respect to the electric machine, the axial connectors being positioned at a wall area of the drive unit and being fixed in position at the stator, the axial connectors comprising stator contacts connected to the winding terminations; and
   wall contacts at the wall area, the wall contacts corresponding to the stator contacts, the wall contacts and the stator contacts being configured to be connected to each other at the wall area via a simultaneous plug-in connection upon axial insertion of the electrical machine into the first housing element;
   wherein the wall contacts are one of electrically connected to the connection device and form the connection device.

2. The drive unit according to claim 1, wherein the wall area is constructed for the arrangement of the wall contacts at a second housing of another component of the drive unit.

3. The drive unit according to claim 2, wherein the housing opening is formed at one of the wall area and at the second housing.

4. The drive unit according to claim 1, further comprising busbars connecting the wall contacts to the connection device.

5. The drive unit according to claim 4, wherein the busbars are arranged inside a receiving space formed by the second housing.

6. The drive unit according to claim 1, wherein the connection device is guided through the housing opening.

7. The drive unit according to claim 1, wherein the stator contacts and the wall contacts are directly connected.

* * * * *